(12) United States Patent
Neff et al.

(10) Patent No.: US 6,954,403 B2
(45) Date of Patent: Oct. 11, 2005

(54) CONCURRENT PHASE ANGLE GRAPHIC ANALYSIS

(75) Inventors: Dennis B. Neff, Grove, OK (US); Edgar L. Butler, Buena Vista, CO (US); William Allen Lucas, Houston, TX (US)

(73) Assignee: ConocoPhillips Company - I. P. Legal, Houston, TX (US)

( * ) Notice: Subject to any disclaimer, the term of this patent is extended or adjusted under 35 U.S.C. 154(b) by 157 days.

(21) Appl. No.: 10/657,608

(22) Filed: Sep. 8, 2003

(65) Prior Publication Data

US 2005/0055164 A1 Mar. 10, 2005

(51) Int. Cl.$^7$ ................................................ G01V 1/28
(52) U.S. Cl. ........................................ 367/48; 367/38
(58) Field of Search ............................. 367/38, 48, 68, 367/73

(56) References Cited

U.S. PATENT DOCUMENTS

| | | | | |
|---|---|---|---|---|
| 5,258,960 A | * | 11/1993 | Swan | 367/38 |
| 5,440,525 A | * | 8/1995 | Dey-Sarkar et al. | 367/52 |
| 5,661,697 A | | 8/1997 | Swan et al. | |
| 5,784,334 A | | 7/1998 | Sena et al. | |
| 6,061,301 A | * | 5/2000 | Corrigan | 367/75 |
| 6,263,284 B1 | * | 7/2001 | Crider et al. | 702/14 |

OTHER PUBLICATIONS

Simm, White, and Uden. "The anatomy of AVO crossplots." The Leading Edge, Feb. 2000.*
Foster, Keys, and Reilly. "Another perpective on AVO crossplotting." The Leading Edge, Sep. 1997.*
Anderson. "The Hodogram as an AVO attribute.".*
Mahob and Castagna. "AVO hodograms and polarization attributes." The Leading Edge, Jan. 2002.*
Keho, Lemanski, Ripple, and Tambunan. "The avo hodogram: Using polarization to identify anomalies." The Leading Edge, Nov. 2001.*
Castagna. "AVO Analysis." CSEG Recorder, Jun. 2001.*
Furniss. "Direct Hydrocarbon Detection Made Easy." Preview, Aug. 2002.*
Swan, "Properties of Direct AVO Hydrocarbon Indicators", Offset–Dependent Reflectivity—Theory and Practice of AVO Analysis (Castagna, J.P. & Backus, M.M., eds., Soc. Expl. Geophys., 1993), pp. 78–92.

* cited by examiner

*Primary Examiner*—Bernarr E. Gregory
*Assistant Examiner*—Scott A. Hughes
(74) *Attorney, Agent, or Firm*—Kameron D. Kelly; Ryan N. Cross (57) ABSTRACT

Waveform data, such as reflection seismic data, is filtered by concurrently analyzing various phase angles of the data. The various phase angles of the data are compared to phase rotated background trends and the phase angle producing the maximum deviation from the equivalent background trend is selected as the optimum phase angle for predictive analysis or exclusion filtering.

30 Claims, 8 Drawing Sheets

(2 of 8 Drawing Sheet(s) Filed in Color)

BACKGROUND (0°) AND TARGET SAMPLES (ALL PHASE ANGLES)

FIG. 8d

CONCURRENT PHASE ANGLE GRAPHIC ANALYSIS

BACKGROUND OF THE INVENTION

1. Field of the Invention

The present invention relates generally to methods of filtering waveform data. In another aspect, the invention concerns a method for manipulating seismic data by analyzing various phase angles of the data to thereby improve the accuracy of rock property predictions.

2. Description of the Prior Art

It is well known that certain physical properties of an object can be non-intrusively measured by transmitting various types of waves (e.g., optical, acoustical, electrical, radiation, or vibration waves) into/onto the object and detecting the waves reflected by the object. The reflected wave data can then be manipulated through various filtering and/or interpreting techniques to provide a relatively accurate indication of one or more physical properties of the object.

Two representative, but vastly different, examples of applications where the physical properties of an object are measured by reflected waves are sonograms and seismic surveys. Sonograms are typically performed on living beings by introducing acoustical waves into the body of the being. The acoustic waves are reflected differently by different body tissues or fluids. The reflected waves are detected and then manipulated in a manner which gives an indication (typically a visual image) of what types of tissues or fluids are present in particular locations of the body. Seismic surveys of the earth are performed by inducing vibrational waves (i.e., compression and/or shear waves) into the earth. The vibrational waves are reflected at different strata in the earth. The reflected waves are detected and manipulated in a manner which provides an indication of the rock properties of the subterranean formation at various locations.

A common problem encountered when using waveform data to determine properties of a physical body is that abrupt boundaries between regions of the body having different physical and acoustic properties can be "smeared" due to the nature of the waveform data. This boundary smearing of waveform data is experienced when relatively low frequency waves (e.g., sinusoidal waves) encounter an abrupt acoustic boundary between two regions having different physical properties. The abrupt boundary will typically not be represented by a spike or a single data point in the waveform data. Rather, the boundary may show up as a sinusoidal wave with one or two large peaks having smaller troughs and peaks reverberating out from the large peak(s). Thus, the boundary between physically dissimilar regions is frequently represented in waveform data by an extended wavelet which crossplots as a cluster of data points, rather than by a single data point.

It is well known to analyze seismic data using graphic or crossplot techniques, such as Amplitude Versus Offset (AVO) crossplotting. The common purpose of such crossplotting is to identify reservoir sand versus shale, or hydrocarbon-bearing sand versus wet sand. This can occur because the data representing sand and the data representing shale tend to plot in different portions of the AVO graph, with shale plotting closer towards the origin of the graph and sand tending to migrate away from the origin. A problem with such analysis of seismic data is that the graphic position of the sand is dependent upon the phase of the seismic data. With certain phases of the data, the crossplotted data representing sand located near a boundary between sand and shale is well separated from the crossplotted background shale trend. However, for certain other phases of the data, the crossplotted data representing sand located near a boundary between sand and shale may be located within the crossplotted background shale trend. Thus, certain phase angles of the seismic data provide a more accurate indication of boundary locations than other phase angles of seismic data. This problem is described in greater detail below with reference to FIGS. 6a and 6b.

OBJECTS AND SUMMARY OF THE INVENTION

It is, therefore, an object of the present invention to provide a method of filtering waveform data by comparing a plurality of phase angles of the data and selecting an optimum phase angle.

Another object of the invention is to provide a method of filtering reflected waveform data representing a particular location in a physical body to provide a more accurate indication of the boundary location between two physically dissimilar regions of the body.

Still another object of the invention is to provide a method of predicting rock properties of a subterranean formation by concurrently analyzing various phase angles of the seismic data and selecting a phase angle which yields the most accurate property prediction.

It should be understood that the above-listed objects are only exemplary, and not all the objects listed above need be accomplished by the invention described and claimed herein.

Accordingly, in one embodiment of the present invention, there is provided a method of manipulating waveform data comprising the steps of: (a) defining a background trend for non-target data; (b) comparing a plurality of phase angles of target data to the background trend; and (c) selecting the phase angle of the target data having the maximum deviation from the background trend.

In another embodiment of the present invention, there is provided a method of filtering sinusoidal target data representing a target location using sinusoidal background data representing a non-target location. The method comprises the steps of: (a) plotting a plurality of phase angles of the background data; (b) defining a background trend for each plotted phase angle of the background data; (c) plotting a plurality of phase angles of the target data; (d) calculating the distance between each phase angle of the plotted target data and the background trend of corresponding phase angle; and (e) selecting the phase angle of the target data with the maximum calculated distance.

In still another embodiment of the present invention, there is provided a method of filtering target seismic data representing a target subterranean location using background seismic data representing a background subterranean location. The target and background seismic data include information about a certain rock property of interest. The rock property of interest provides important information about the target location when the value of the rock property of interest is within a critical range. The background seismic data indicates a value for the rock property of interest that is outside the critical range. The method comprises the steps of: (a) plotting a plurality of phase angles of the background seismic data; (b) defining a background trend for each phase angle of the plotted background seismic data; (c) plotting a plurality of phase angles of a first sample of the target seismic data; (d) for each plotted phase angle of the first sample, calculating a distance to the background trend of corresponding phase angle; and (e) selecting the phase angle of the first sample with the largest calculated distance.

In yet another embodiment of the present invention, there is provided a method for predicting rock properties of a subterranean formation using reflection seismic data and well log data. The method comprises the steps of: (a) generating reflection seismic traces from the reflection seismic data; (b) generating synthetic seismic traces from the well log data; (c) correlating the reflection seismic traces with the synthetic seismic traces using a plurality of common seismic attributes of the reflection and synthetic seismic traces; and (d) assigning well log data associated with the synthetic seismic traces to the reflection seismic traces based on the correlation of step (c). The correlation of step (c) includes the substeps of: (c1) plotting a plurality of phase angles of a first sample of the reflection seismic data; (c2) calculating a distance between the plotted first sample and a background trend for each of the phase angles of the first sample; and (c3) using for said correlation, the phase angle of the first sample having the maximum calculated distance.

BRIEF DESCRIPTION OF THE DRAWING FIGURES

This patent or application file contains at least one drawing executed in color. Copies of this patent or patent application publication with color drawings will be provided by the Office upon request and payment of the necessary fee.

Embodiments of the present invention are described in detail below with reference to the attached drawing figures, wherein.

DETAILED DESCRIPTION OF THE PREFERRED EMBODIMENT

The present invention finds application in a variety of situations where digital or analog waveform data/signals are electronically processed. The processed waveform data/signals can be generated from a number of different sources such as, for example, radiation waves, optical waves, acoustical waves, electrical waves, or physical/vibrational waves. The present invention can be advantageously applied to waveform data that is used to indicate the physical properties of an object or waveform data is used to locate boundaries between two physically dissimilar regions of an object. In a preferred application, the waveform data employed in the inventive process represents waves that have been reflected by a physical body. However, it is entirely within the ambit of the present invention for the processed waveform data to represent non-reflected waves/signals such as, for example, digital or analog communication signals or acoustical (e.g., musical) signals.

Figure 1:
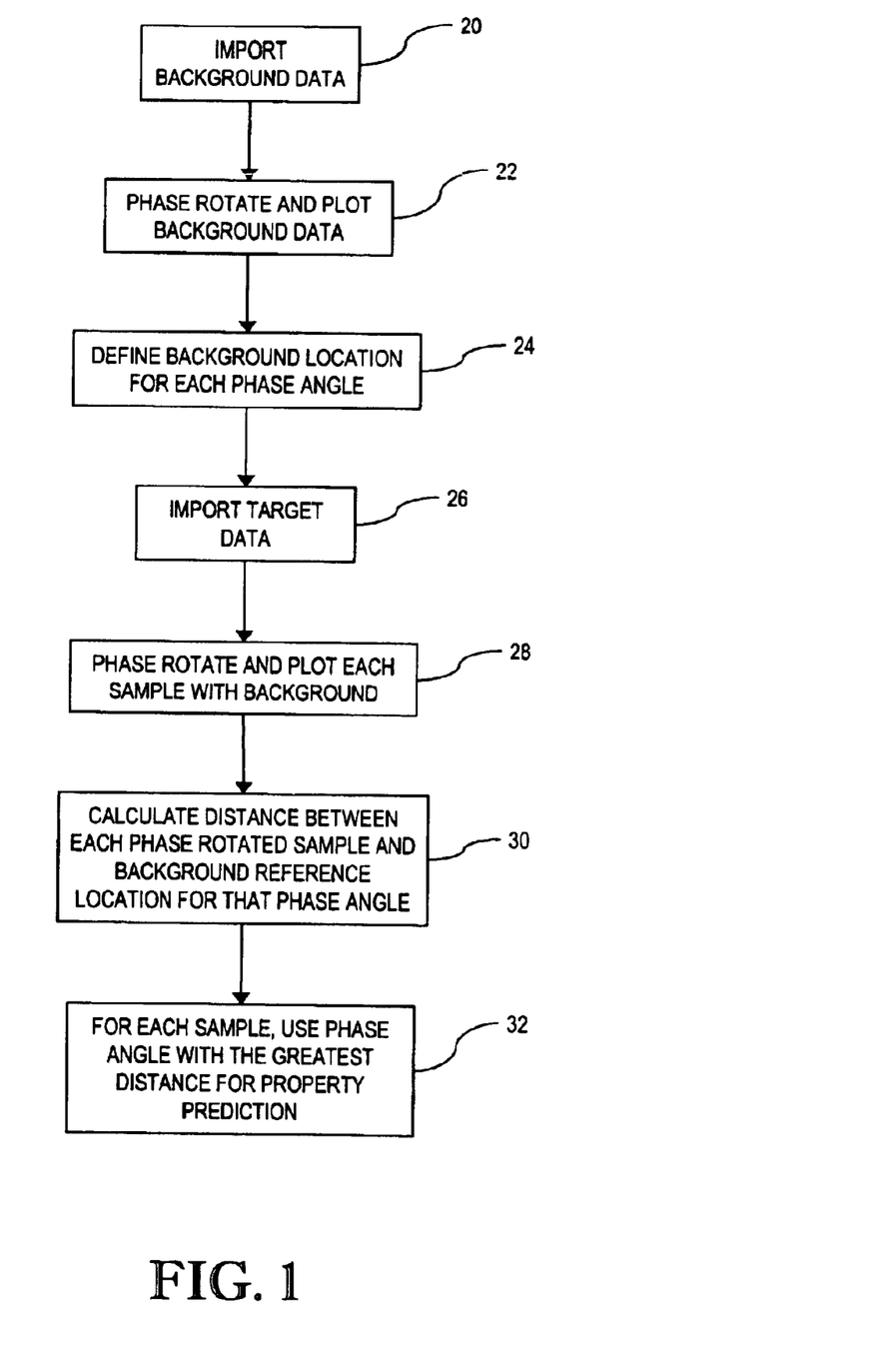
FIG. 1 is a computer flow chart outlining the steps for filtering waveform target data by testing various phase angles of the target data against a background trend.

Referring to FIG. 1, in a first step 20 of the data/signal filtering method, background data is imported into computer memory. The background data preferably represents a substantially homogenous region of a physical body which does not possess the physical properties sought to be identified through the inventive method. For example, if the inventive method is being applied to sonogram data being used to locate a certain type of tumor in a human body, the background data should represent a substantially homogenous area of the body where it is known that the tumor does not exist. Alternatively, if the inventive method is being applied to seismic data being used to locate regions of high porosity in a subterranean formation, the background data should represent a substantially homogenous area of the subterranean formation that is known to have a relatively low porosity.

In step 22 of the method, the background data is phase rotated and each set of phase rotated background data is plotted. The number of phase angles of the background data computed and plotted can vary greatly depending upon the type of data being employed. However, it is preferred for at least two phase angles (e.g., zero phase and −90° phase) of the background data to be generated and plotted. More preferably, two to eight phase angles of the background data are generated and plotted. Most preferably, four phase angles (e.g., zero phase, −45° phase, −90° phase, and −135° phase) of the background data are generated and plotted.

Figure 2A:
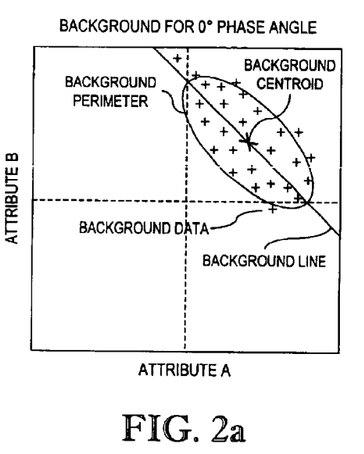
FIG. 2a is a two-dimensional crossplot showing the location of zero phase background data points on the crossplot and illustrating several techniques for defining a background trend for the zero phase background data.
Figure 2B:
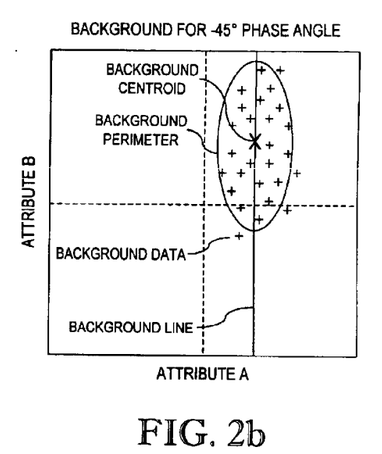
FIG. 2b is a two-dimensional crossplot showing the location of −45° phase background data points on the crossplot and illustrating several techniques for defining a background trend for the −45° phase background data.

Referring to FIGS. 2a and 2b, the plotting of the various phase angles of the background data can be performed using a two-dimensional crossplot with the X and Y axes representing attributes of the background data that are predictive of the property sought to be determined. For example, in FIGS. 2a and 2b, Attribute A (on the X axis) could be amplitude and Attribute B (on the Y axis) could be frequency in a situation where the amplitude and frequency of the waveform data are predictive of the properties sought to be determined. Although FIGS. 2a and 2b illustrate only a two-dimensional crossplot, it should be understood that the plotting of the various phase angles of the background data can be performed using a multi-dimensional vector defined by three or more attributes of the background data. A comparison of FIGS. 2a and 2b illustrates that the plotted position of the background data typically changes depending upon the phase angle of the background data.

Referring to FIGS. 1, 2a, and 2b, in step 24 (FIG. 1) a background location/trend for each phase angle of the background data is defined. The manner in which the background location is defined can vary greatly depending upon the position, orientation, and scatter of the plotted background data. FIGS. 2a and 2b illustrate three possible ways of defining the background location/trend. Perhaps the simplest way to define the background location is by a single point representing the centroid of the plotted background data. The use of the centroid as the background location may be preferred where the plotted background data is fairly concentrated in a particular area. An additional way to define the background location is by a straight line extending through the geometric center of the background data. The use of a straight line as the background location may be preferred where the plotted background data is somewhat scattered, but the pattern of the scattered data is elongated. Another way to define the background location is to define an outer perimeter of a shape within which the majority of the background data points are located (e.g., the elliptical shape shown in FIGS. 2a and 2b). The use of an outer perimeter of a shape as the background location may be preferred where the plotted background data is scattered, but the pattern of the scattered data has a somewhat regular shape. The three examples (shown in FIGS. 2a and 2b) of how the background location/trend can be defined are by no means an exhaustive list, and numerous alternative methods of defining the background location/trend may be employed without departing from the scope of the present invention. For example, if the background data is plotted in three-dimensional space, it may be best to define the background location/trend by a plane slicing through the data or by the outer surface of a shape (e.g., an ellipsoid) within which most of the data points are located.

Referring again to FIG. 1, in step 26, target data is imported into computer memory for further manipulation. The target data is preferably waveform data representing a target location of a physical body for which a selected physical property is sought to be determined. The location represented by the target data (i.e., the target location) should be different from the location represented by the background data (i.e., the background location). When the value of the selected physical property of the target location is within a certain critical range, such selected physical property provides important information about the target location. The background data functions as a "blank" with respect to the selected physical property. Thus, it is preferred for the background data to have a value of the selected physical property that is outside the critical range. For example, in the case of seismic data, the selected physical property of the target location may be porosity because the porosity of a subterranean formation provides important information about whether or not hydrocarbons can be profitably produced from that location in the subterranean formation. Thus, if a porosity value between 20% and 30% (i.e., the critical range of porosity values) represents an optimum porosity for producing hydrocarbons from the subterranean formation, the background data should exhibit a porosity value outside and less than the 20% to 30% range.

Figure 3A:
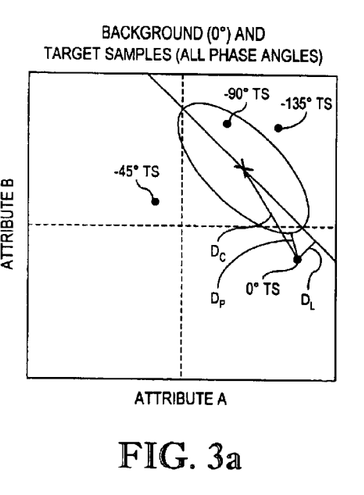
FIG. 3a is a two-dimensional crossplot showing the location of various phase angles of a target data sample relative to the zero phase background trend defined in FIG. 2a, particularly illustrating different methods of measuring the distance between the zero phase target data sample and the zero phase background trend depending upon how the background trend has been defined.
Figure 3B:
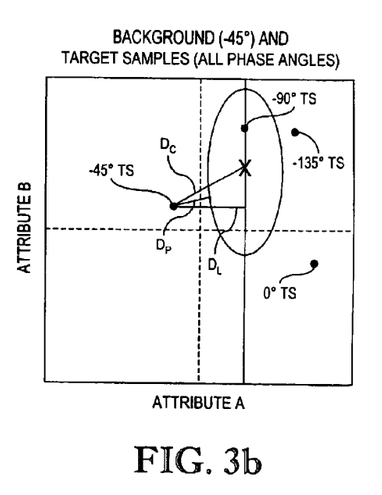
FIG. 3b is a two-dimensional crossplot showing the location of various phase angles of a target data sample relative to the −45° phase background trend defined in FIG. 2b, particularly illustrating different methods of measuring the distance between the −45° phase target data sample and the −45° phase background trend depending upon how the background trend has been defined.

Referring to FIGS. 1, 3a, and 3b, in step 28 (FIG. 1), individual samples (e.g., time samples) of the target data are phase rotated and plotted with the background defined for the corresponding phase angle. FIG. 3a shows four phase angles (i.e., zero phase, −45° phase, −90° phase, and −135° phase) of a single target data sample plotted against the defined zero phase background location/trend. FIG. 3b shows the same four phase angles of the same target data sample plotted against the defined −45° phase background location/trend. In step 30 (FIG. 1), the distance between each phase rotated target data sample and the defined background location/trend for that phase angle is calculated. FIG. 3a shows three different ways in which the distance between the zero phase target data sample and the zero phase background location/trend can be calculated. According to one method, the distance ($D_C$) between the zero phase target sample and the background centroid point is calculated. According to another method, the minimum distance ($D_L$) between the zero phase target sample and the background line is calculated. According to a further method, the minimum distance ($D_P$) between the zero phase target sample and the perimeter of the background shape is calculated. FIG. 3b shows the same three ways of calculating the distance ($D_C$, $D_L$, $D_P$) between the −45° phase target sample and the −45° phase background location/trend. As mentioned above, the particular method used to calculate the distance between the target sample and the background location/trend is data dependent. In fact, the calculated distance of step 30 (FIG. 1) could even be a statistical combination (e.g., average) of one or more of the individually calculated distances (e.g., $D_C$, $D_L$, and $D_P$).

Referring to FIG. 1, in step 32, for each target sample the phase angle yielding the greatest distance from the background location/trend is used for further data/signal processing. In a preferred embodiment, such phase angle of the target sample is used to predict the selected physical property at the target location.

Figure 4:
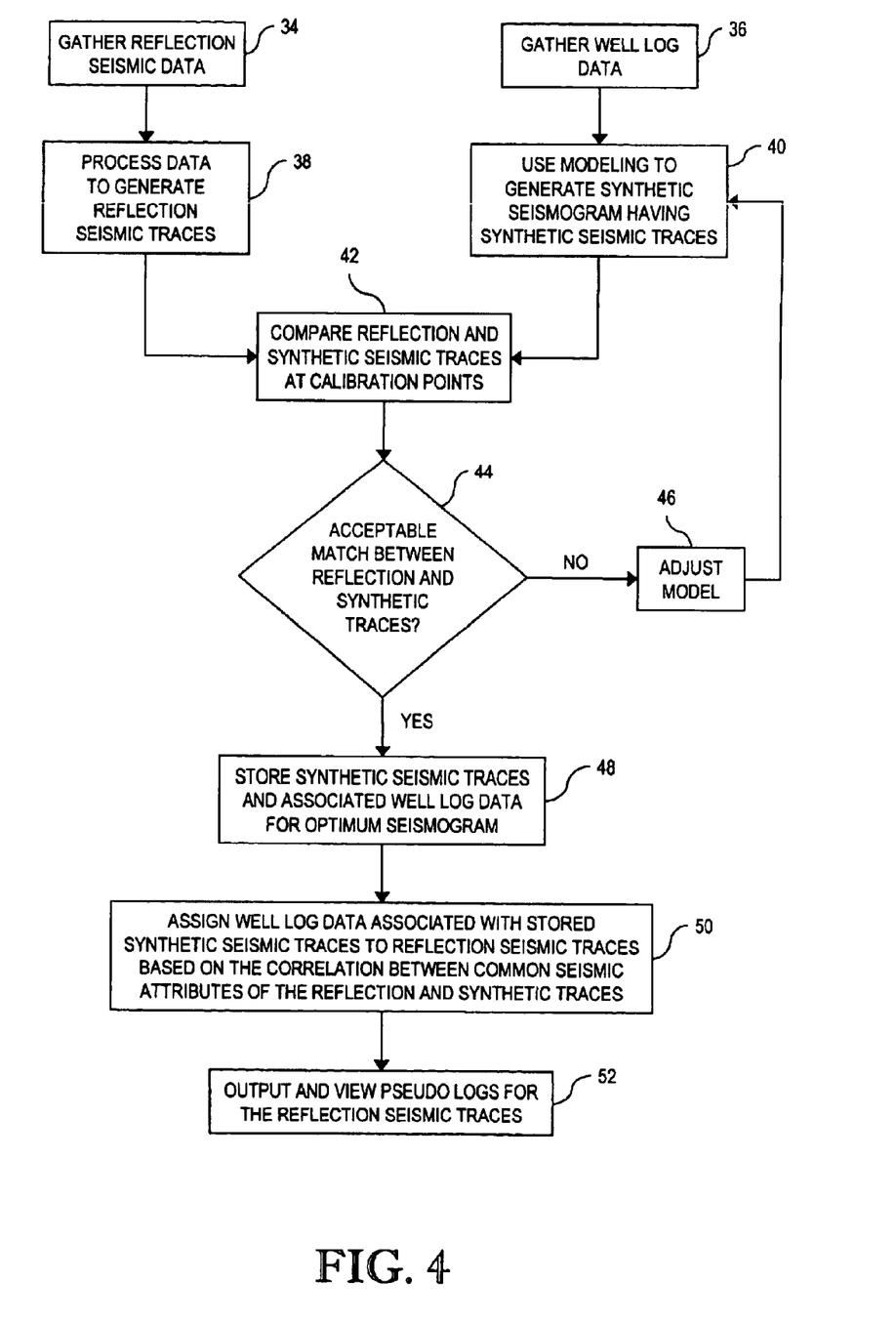
FIG. 4 is a computer flow chart outlining the steps involved in a particular method of predicting rock properties of a subterranean formation based upon well log data and reflection seismic data.

Referring now to FIG. 4, it has been discovered that the waveform data filtering method outlined in FIG. 1 can be advantageously employed in the method of predicting rock properties of a subterranean formation outlined in FIG. 4. The steps of the rock property prediction method, outlined in FIG. 4, will be described in detail below; however, it should be understood that the inventive waveform data filtering method can be applied to a variety of different types of seismic data manipulation techniques. For example, U.S. patent application Ser. No. 10/302,268 entitled Improved Method of Predicting Rock Properties from Seismic Data, provides a detailed description of a rock property prediction method within which the inventive data filtering scheme outlined in FIG. 1 can be employed. The entire disclosure of U.S. patent application Ser. No. 10/302,268 is hereby incorporated herein by reference.

Referring again to FIG. 4, in step 34 reflection seismic data is gathered via a conventional reflection seismic survey. The reflection seismic data represents various target locations in a subterranean region of interest. In step 36 well log data is gathered in accordance with conventional practice. The well log data typically includes information relating to rock properties of the subterranean region of interest at certain calibration locations. The rock property information of the well log data may include, for example, depth-scale logs of hydrocarbon saturation, porosity, density, P-wave sonic, shear wave sonic, shaliness, and pay zones. The well log data can be either actual well log data taken within the region of interest represented by the reflection seismic data or hypothetical well log data estimating expected rock properties at the region of interest.

In step 38 (FIG. 4) the reflection seismic data is imported into computer memory and processed to generate reflection seismic traces. The processing of the reflection seismic data generally includes conventional techniques for stacking and migrating the reflection seismic data to thereby form a spatial sequence of seismic time scale traces. In step 40 the well log data is imported into computer memory and modeling is used to generate a synthetic seismogram formed of a plurality of synthetic seismic traces. A variety of conventional methods are known for generating synthetic seismograms from well log data. Typically, the generation of a synthetic seismogram is accomplished by passing a wavelet extracted from the actual reflection seismic data through a reflection coefficient equation derived from the P-wave sonic, density, and shear sonic to get the synthetic traces. Details of wavelet processing for producing synthetic seismograms are disclosed in U.S. Pat. No. 5,487,001, the entire disclosure of which is incorporated herein by reference.

In step 42 (FIG. 4), the reflection seismic traces generated in step 38 and the synthetic seismic traces generated in step 40 are compared at calibration points in the subterranean region of interest. In step 44, the method asks whether or not an acceptable match between the reflection and synthetic seismic traces exists. If the match between the reflection and synthetic seismic traces is unacceptable, the synthetic seismogram model is adjusted in step 46. The adjusted model can then be used in step 40 to generate a new set of synthetic seismic traces which more closely match the reflection seismic traces. If the match between the reflection and synthetic seismic traces in step 44 is acceptable, step 48 stores the synthetic seismogram and associated well log data in computer memory.

In step 50 (FIG. 4), the well log data associated with the stored synthetic seismic traces are assigned to reflection seismic traces based on a correlation between common seismic attributes of the reflection and synthetic seismic traces. The correlation between the common seismic attributes of the reflection and synthetic seismic traces and the assignment of well log data associated with the synthetic seismic traces to the reflection seismic traces of step 50 can be performed in accordance with the method described in U.S. patent application Ser. No. 10/302,268. In step 52, pseudo logs for the reflection seismic traces are outputted and viewed. The pseudo logs contain rock property predictions.

Figure 5A:
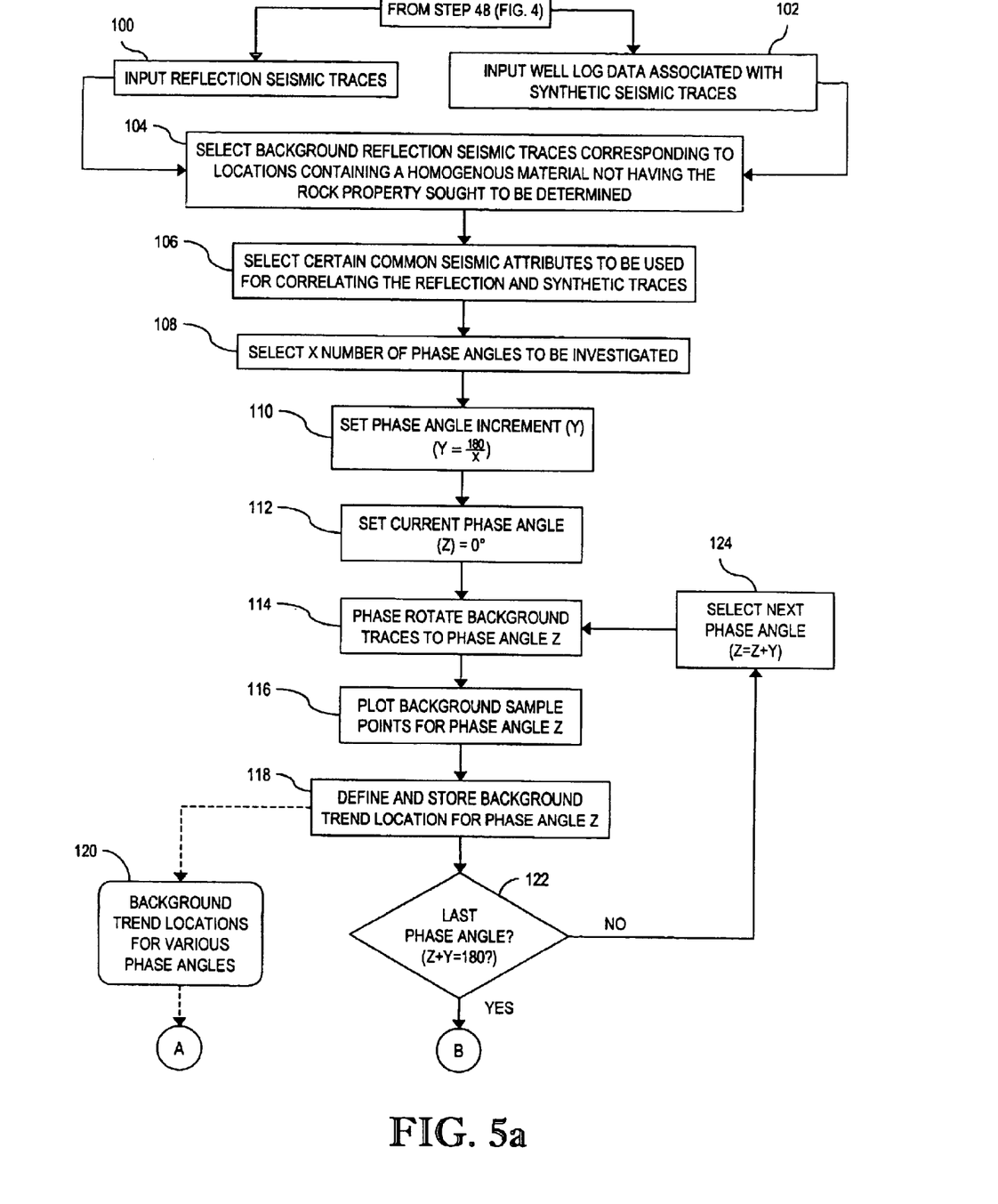
FIGS. 5a and 5b illustrate an expanded flow chart of step 50 in FIG. 4, particularly showing the manner in which reflection and synthetic seismic traces can be more accurately correlated using a technique which analyzes a plurality of phase angles of the seismic data and compares each phase angle to a background trend.
Figure 5B:
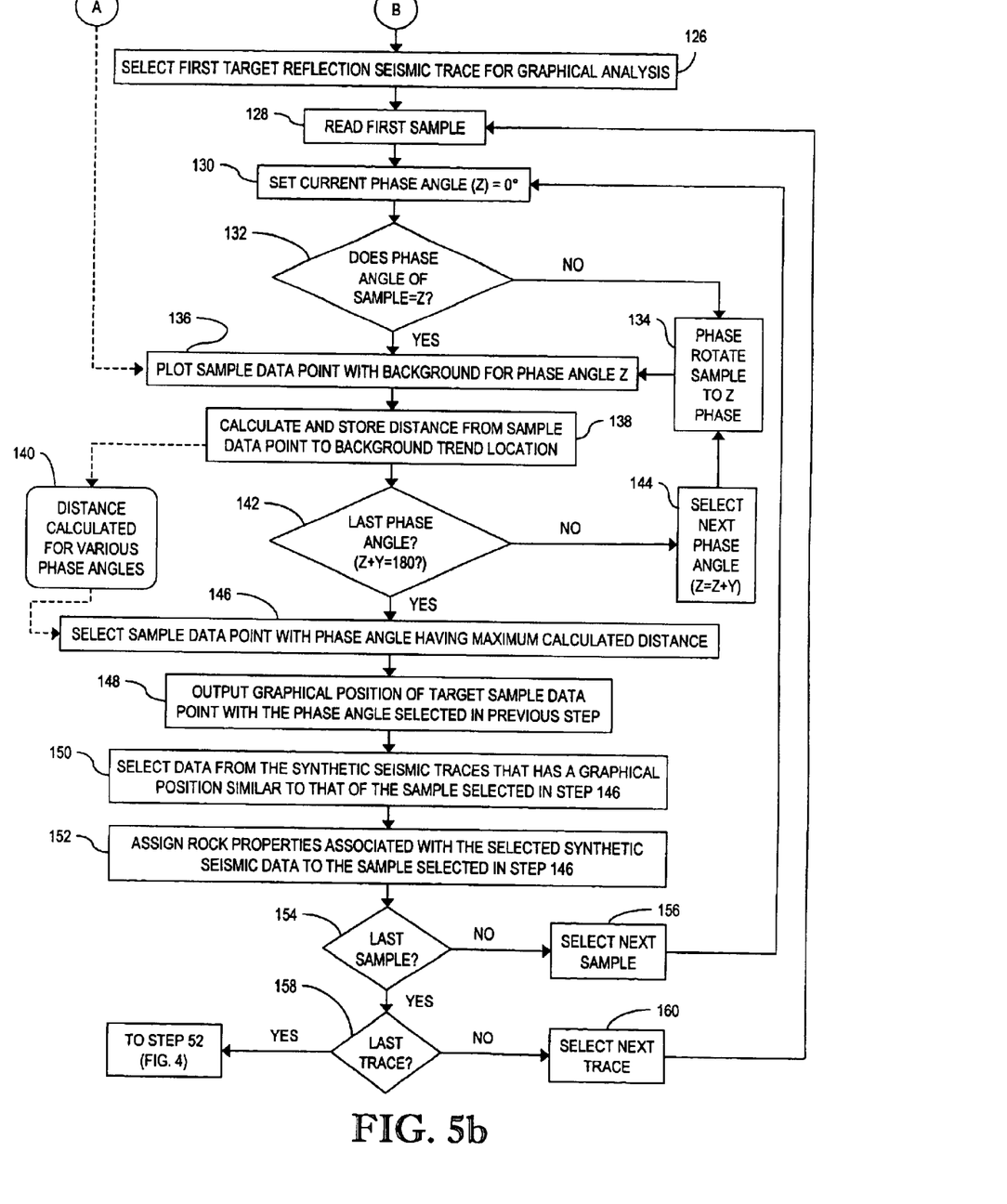

Referring to FIGS. 5a and 5b, steps 100 through 160 provide a more detailed description of how step 50 of FIG. 4 is performed. In step 100 (FIG. 5a), the reflection seismic traces generated in step 38 (FIG. 4) are inputted into computer memory. In step 102 (FIG. 5a), the well log data associated with the synthetic seismic traces is inputted into computer memory. In step 104 (FIG. 5a), background reflection seismic traces are selected. The background reflection seismic traces preferably correspond to locations in the subterranean formation known to contain a homogenous material that does not possess the rock property sought to be determined.

In step 106 (FIG. 5a), certain common seismic attributes are selected for correlating the reflection and synthetic seismic traces. These common seismic attributes can include, but are not limited to, seismic attributes such as amplitude, gradient, isochron, and sonic. It is preferred for the common seismic attributes selected in step 106 to be predictive of the rock property sought to be determined. In step 108 (FIG. 5a) X number of phase angles are selected for investigation. In step 110 (FIG. 5a) a phase angle increment (Y) is set. The phase angle increment (Y) can simply be equal to 180° divided by the number of phase angles to be investigated (X). Preferably, the number of phase angles to be investigated (X) is at least two, more preferably two to eight, and most preferably four.

In step 112 (FIG. 5a), the current phase angle (Z) is set equal to 0°. In step 114 the background traces are phase rotated to the current phase angle (Z). In step 116, all background sample points for the current phase angle (Z) of the background data are plotted. In step 118, a background trend location for the current phase angle (Z) is defined and stored. As discussed above with respect to FIGS. 2a and 2b, the background trend location can be defined in a variety of different manners. The background trend location for the current phase angle (Z) is stored in computer memory 120 (FIG. 5a).

In step 122 (FIG. 5a), the method asks whether or not the current phase angle (Z) is the last phase angle to be investigated. If the current phase angle (Z) plus the phase angle increment (Y) is equal to 180°, then the current phase angle (Z) is the last phase angle. If the current phase angle (Z) is not the last phase angle, the method continues to step 124 where the next phase angle is selected by adding the phase angle increment (Y) to the current phase angle (Z). Steps 114 through 122 are repeated for each phase angle until computer memory 120 includes defined background trend locations for all phase angles investigated.

After background trends for all the phase angles investigated have been defined and stored, the method proceeds to step 126 (FIG. 5b) where a first target reflection seismic trace is selected for graphic analysis. In step 128 (FIG. 5b) a first sample of the first target reflection seismic trace selected in step 126 is read. In step 130 (FIG. 5b) the current phase angle (Z) is set equal to 0°. In step 132 (FIG. 5b) the method asks whether or not the phase angle of the current sample is equal to the current phase angle (Z). If the phase angle of the current sample is not equal to the current phase angle (Z) the current sample is phase rotated in step 144 to the current phase angle (Z).

In step 136 (FIG. 5b) the current sample data point is plotted with the background trend from memory 120 (FIG.

5a) corresponding to the current phase angle (Z). In step 138 (FIG. 5b), the distance between the current sample data point and the background trend location for the current phase angle (Z) is calculated. This calculated distance from step 138 can then be stored in computer memory 140. In step 142, the method asks whether or not the current phase angle (Z) is the last phase angle to be investigated. If the current phase angle (Z) plus the phase angle increment (Y) is equal to 180°, then the current phase angle (Z) is the last phase angle to be investigated. If the current phase angle (Z) is not the last phase angle to be investigated, the method proceeds to step 144 where the next phase angle is selected. After the next phase angle is selected in step 144, the current sample is phase rotated to the phase angle selected in step 134. Steps 136 through 142 are repeated for each phase angle of the current sample data point.

After all phase angles of the current sample data point have been investigated, the method proceeds to step 146 (FIG. 5b) where the sample data point with the phase angle having the maximum calculated distance (stored in computer memory 140) is selected. In step 148 (FIG. 5b) the graphical position of the target sample data point with the phase angle selected in step 146 is outputted. The data from the synthetic seismic trace that has a graphical position similar to that of the sample selected in step 146 is selected. In step 152 (FIG. 5b) the rock properties associated with the selected synthetic seismic trace are assigned to the sample data point selected in step 146.

In step 154 (FIG. 5b), the method asks whether or not the current sample is the last sample of the current trace to be investigated. If the current sample is not the last sample of the current trace to be investigated, the method proceeds to step 156 and selects the next sample as the current sample. The method then repeats steps 130 through 154 for the new current sample data point. If the current sample is the last sample of the current trace, the program proceeds from step 154 to step 158 where the program asks whether or not the current trace is the last trace to be investigated. If the current trace is not the last trace to be investigated, the program proceeds to step 160 and selects the next trace as the new current trace. Steps 128 through 158 are then repeated for the new trace. If it is determined in step 158 that the current trace is the last trace, the program proceeds to step 52 (FIG. 4).

Figure 6A:
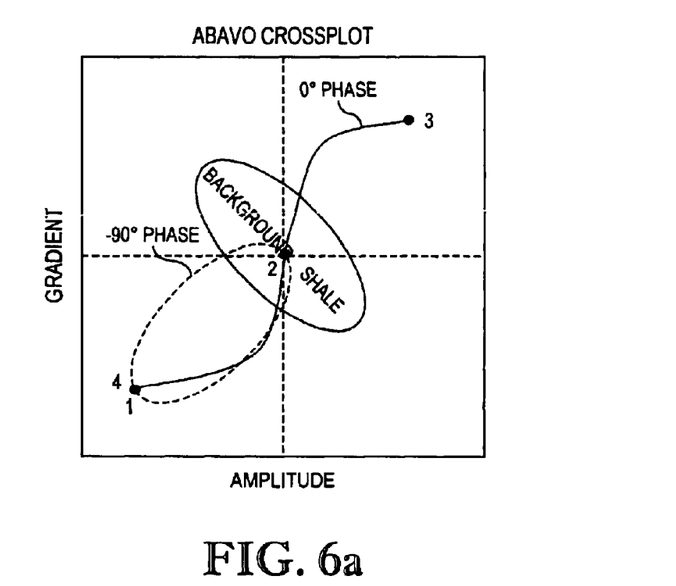
FIG. 6a is a simplified amplitude versus gradient (ABAVO) crossplot showing how different phase angles of a seismic wavelet (shown in FIG. 6b) plot in different locations on the graph relative to a background shale trend.
Figure 6B:
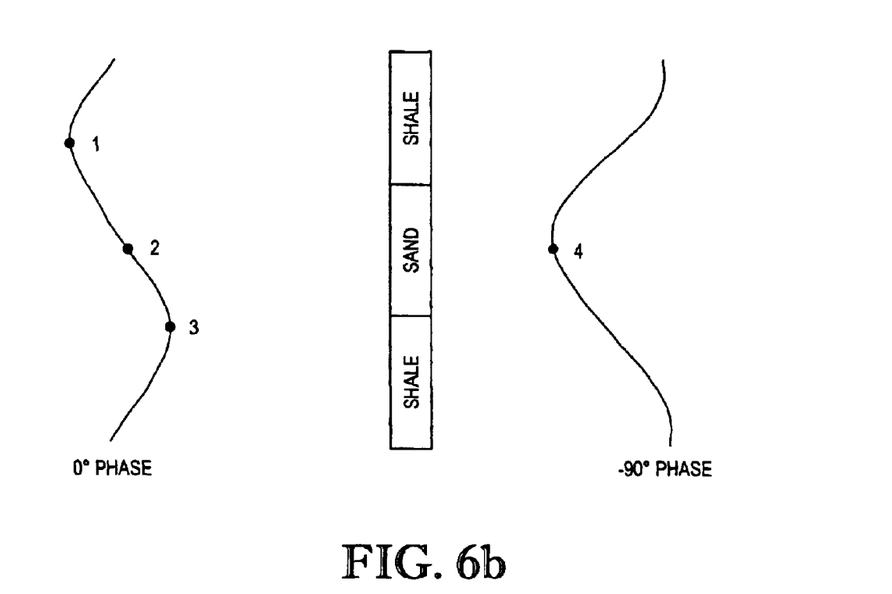
FIG. 6b is a simplified representation of a zero phase and −90° phase wavelet representing a sand body disposed between two shale bodies, particularly illustrating the manner in which the different phase data represents the location of the sand in a different manner.

Referring now to FIGS. 6a and 6b, a brief description and illustration is provided herein to help show one situation in which the concurrent phase angle graphic analysis method of the present invention can be applied to seismic data to help provide a more accurate property prediction. FIG. 6a shows an ABAVO crossplot having amplitude as the X axis and gradient as the Y axis. It is well known in the art that such a crossplot can provide information about the rock properties of a particular subterranean region when the reflection seismic data is plotted thereon and compared to a background trend. FIG. 6a shows a typical background shale trend. Generally, reflection seismic data representing non-shale subterranean regions will plot outside of the background shale region along a positive 45° line extending through the origin. However, the crossplot of FIG. 6a illustrates that the position of the plotted data changes depending upon its phase angle. FIG. 6b shows the zero phase and −90° phase of a wavelet representing a subterranean region of sand disposed between upper and lower regions of shale. When the zero phase and −90° phase wavelets of FIG. 6b are plotted on the crossplot of FIG. 6a, it can be seen that the −90° phase wavelet provides a more accurate indication of the location of the sand body. As mentioned above, sand should typically plot away from the background shale along a +45° line extending through the origin of the ABAVO crossplot. Point 4 of the −90° wavelet (shown in FIG. 6b) plots on the ABAVO crossplot (shown in FIG. 6a) a great distance from the background shale, thereby providing an accurate indication that point 4 of the −90° phase wavelet represents sand. However, the zero phase wavelet (shown in FIG. 6b) provides an inaccurate representation of the location of the sand when plotted on the ABAVO crossplot (shown in FIG. 6a). This is illustrated by the location of points 1 and 3 on the ABAVO crossplot. Points 1 and 3 from the zero phase wavelet (shown in FIG. 6b) actually represent the location of shale, but plot far away from the background shale trend on the ABAVO crossplot (shown in FIG. 6a), whereas point 2, which actually represents sand, plots within the background shale region of the ABAVO crossplot. Thus, it can be seen that when the −90° phase data is crossplotted, a much more accurate representation of the sand and shale regions is provided than when the zero degree phase wavelet is plotted. As discussed above, the present invention can account for this variability of the different phase angles by concurrently investigating multiple phase angles of the waveform data and using a distance-from-background test (described above) to select the optimum phase angle on a sample-by-sample basis.

Figure 7A:
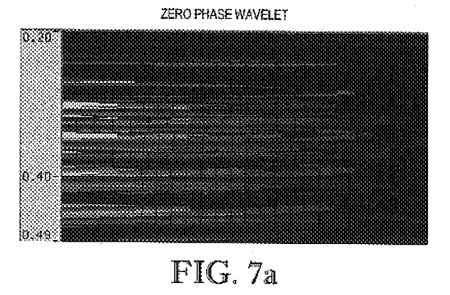
FIG. 7a graphically illustrates porosity predictions resulting from an inversion process employing only zero phase data.
Figure 7B:
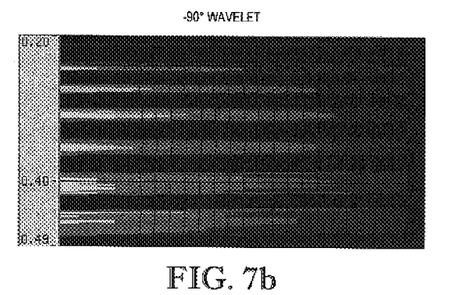
FIG. 7b graphically illustrates porosity predictions resulting from an inversion process employing only −90° phase data.
Figure 7C:
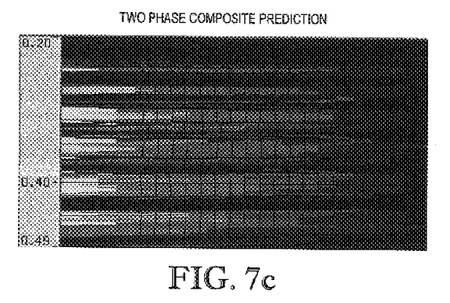
FIG. 7c graphically illustrates a composite porosity prediction resulting from an inversion process which concurrently analyzes both zero and −90° phase data to make the porosity prediction.
Figure 7D:
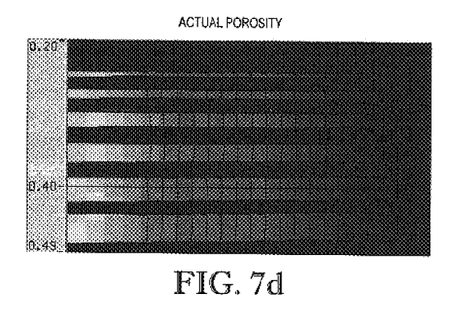
FIG. 7d graphically illustrates the actual porosity determined from well logs at the location represented in FIGS. 7a–c.

Referring to FIGS. 7a through 7d, a comparison is provided to show that the accuracy of a rock property prediction using reflection seismic data is enhanced by investigating multiple phase angles of the reflection seismic data. FIG. 7d illustrates the actual porosity of a subterranean region measured using conventional well log techniques. Yellow colors in FIG. 7 represent 30% porosity, green colors are 15% porosity, and dark blue colors represent 0% porosity. FIG. 7a shows a prediction of the porosity for the same subterranean location represented in FIG. 7d, with the prediction being made using only zero phase data. FIG. 7b is similar to FIG. 7a; however, only −90° phase data was used to make the porosity prediction. FIG. 7c is a composite prediction of porosity generated using the inventive concurrent phase angle analysis to concurrently investigate both the zero and −90° phase data. It can be seen that a more accurate prediction of the porosity is obtained when investigating more than one phase angle.

Figure 8A:
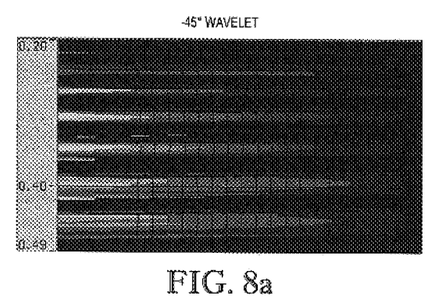
FIG. 8a graphically illustrates porosity predictions resulting from an inversion process employing only −45° data.
Figure 8B:
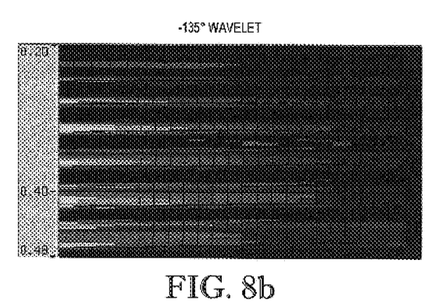
FIG. 8b graphically illustrates porosity predictions resulting from an inversion process employing only −135° data.
Figure 8C:
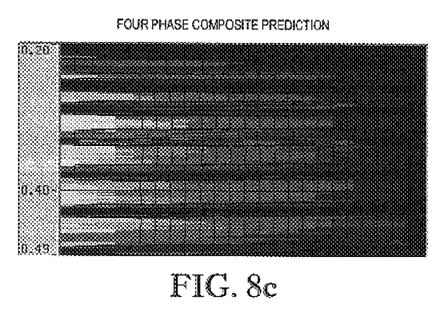
FIG. 8c graphically illustrates a composite porosity prediction resulting from an inversion process which concurrently analyzes zero, −45°, −90°, and −135° phase data to make the porosity prediction.
Figure 8D:
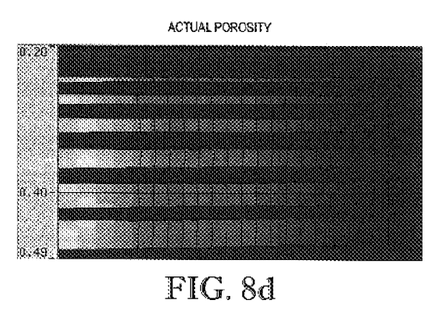
FIG. 8d graphically illustrates the actual porosity determined from well logs at the location represented in FIGS. 7a–c and 8a–c.

Referring to FIGS. 8a through 8d, two additional phase angles (−45° phase and −135° phase) of the reflection seismic data can be investigated. FIG. 8d is the same as FIG. 7d, illustrating the actual porosity of the subterranean region measured using conventional well log techniques. FIG. 8a shows a prediction of the porosity for the subterranean location, with the prediction being made using only −45° phase data. FIG. 8b is similar to FIG. 7a; however, only −135° phase data was used to make the porosity prediction. FIG. 8c is a composite prediction of porosity generated using the inventive concurrent phase angle analysis to concurrently investigate all four phases (i.e., zero phase, −45° phase, −90° phase, and −135° phase) of the reflection seismic data. It can be seen that the composite prediction of FIG. 8c provides a more accurate indication of porosity than any prediction using only a single phase angle.

The preferred forms of the invention described above are to be used as illustration only, and should not be used in a limiting sense to interpret the scope of the present invention. Obvious modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A method of manipulating waveform data, said method comprising the steps of:
   (a) defining a background trend for non-target data;
   (b) comparing a plurality of phase angles of target data to the background trend; and
   (c) selecting the phase angle of the target data having the maximum deviation from the background trend.

2. The method according to claim 1,
   step (b) including plotting the target data and the background trend.

3. The method according to claim 2,
   step (b) including calculating the distance between the plotted target data and the plotted background trend for each phase angle of the target data.

4. The method according to claim 3,
   step (c) including selecting the phase angle of the target data having the maximum calculated distance from the background trend.

5. The method according to claim 1; and
   (d) using the selected phase angle of the target data to predict a selected property of a target area represented by the target data.

6. The method according to claim 5,
   said selected property providing important information about the target area when the value of the selected property is within a critical range,
   said non-target data representing a background area where the value of the selected property is outside the critical range.

7. The method according to claim 6,
   said target data and non-target data being seismic data representing subterranean target and background areas, respectively.

8. The method according to claim 7,
   said selected property being a rock property of a subterranean formation that is relevant in determining whether or not hydrocarbons can be profitably produced from the subterranean formation.

9. A method of filtering sinusoidal target data representing a target location using sinusoidal background data representing a non-target location, said method comprising the steps of:
   (a) plotting a plurality of phase angles of the background data;
   (b) defining a background trend for each plotted phase angle of the background data;
   (c) plotting a plurality of phase angles of the target data;
   (d) calculating the distance between each phase angle of the plotted target data and the background trend with equivalent phase angle; and
   (e) selecting the phase angle of the target data with the maximum calculated distance.

10. The method according to claim 9,
    steps (a) and (c) including plotting the corresponding phase angles of the background and target data using common coordinates.

11. The method according to claim 10,
    said target data and background data being seismic data.

12. The method according to claim 11,
    said common coordinates being various seismic attributes of the background and target data,
    said various seismic attributes being predictive of a certain rock property of interest.

13. The method according to claim 12; and
    (f) using the selected phase angle of the target data to predict the rock property of interest.

14. The method according to claim 13,
    said rock property of interest providing important information about the target location when the value of the rock property of interest is within a critical range,
    said non-target location having a value of the rock property of interest which is outside the critical range.

15. The method according to claim 14,
    said rock property of interest being relevant in determining whether or not hydrocarbons can be profitably produced from the target location.

16. A method of filtering target seismic data representing a target subterranean location using background seismic data representing a background subterranean location, said target and background seismic data including information about a certain rock property of interest, said rock property of interest providing important information about the target location when the value of the rock property of interest is within a critical range, said background seismic data indicating a value for the rock property of interest that is outside the critical range, said method comprising the steps of:
    (a) plotting a plurality of phase angles of the background seismic data;
    (b) defining a background trend for each phase angle of the plotted background seismic data;
    (c) plotting a plurality of phase angles of a first sample of the target seismic data;
    (d) for each plotted phase angle of the first sample, calculating a distance to the background trend of corresponding phase angle; and
    (e) selecting the phase angle of the first sample with the largest calculated distance.

17. The method according to claim 16; and
    (f) repeating steps (c) through (e) for a plurality of other samples of the target seismic data.

18. The method according to claim 17; and
    (g) using the selected phase angle of said first sample and said plurality of other samples to predict the rock property of interest at the target subterranean location.

19. The method according to claim 18,
    said rock property of interest providing information that is relevant in determining whether or not hydrocarbons can be profitably produced from the target subterranean location.

20. A method of predicting rock properties of a subterranean formation using reflection seismic data and well log data, said method comprising the steps of:
    (a) generating reflection seismic traces from the reflection seismic data;
    (b) generating synthetic seismic traces from the well log data;
    (c) correlating the reflection seismic traces with the synthetic seismic traces using a plurality of common seismic attributes of the reflection and synthetic seismic traces, said correlation including the substeps of:
       (c1) plotting a plurality of phase angles of a first sample of the reflection seismic data;

(c2) calculating a distance between the plotted first sample and a background trend for each of the phase angles of the first sample; and (c3) using for said correlation, the phase angle of the first sample having the maximum calculated distance; and (d) assigning well log data associated with the synthetic seismic traces to the reflection seismic traces based on said correlation.

21. The method according to claim 20, substep (c1) including plotting the reflection seismic data using selected seismic attributes of the reflection seismic data, said selected seismic attributes being predictive of a rock property of interest, said rock property of interest being predictive of the ability to profitably produce hydrocarbons from the subterranean formation.

22. The method according to claim 20; and (c4) repeating steps (c1) through (c3) for a plurality of other samples of the reflection seismic data.

23. The method according to claim 20; and (c5) plotting a plurality of phase angles of the background trend, said plotted phase angles of the background trend corresponding to the plotted phase angles of the first sample of the reflection seismic data.

24. The method according to claim 20, step (d) including assigning a statistical distribution of the well log data associated with the synthetic seismic traces to the reflection seismic traces.

25. The method according to claim 20; and (c6) quantizing the data from the synthetic and reflection seismic traces into an equal number of synthetic and reflection data subcells so that each reflection data subcell corresponds to one synthetic data subcell based on the values of the common seismic attributes of the data from the reflection and synthetic seismic traces.

26. The method according to claim 25, step (d) including assigning well log data associated with the synthetic data subcells to reflection seismic data points landing in corresponding reflection data subcells.

27. A computer program including electronically executable instructions for carrying out the method of claim 1.

28. A computer program including electronically executable instructions for carrying out the method of claim 9.

29. A computer program including electronically executable instructions for carrying out the method of claim 16.

30. A computer program including electronically executable instructions for carrying out the method of claim 20.

* * * * *